United States Patent

Cyba

[15] 3,673,186

[45] June 27, 1972

[54] N HYDROXY ALKYL-N'CYCLOALKYL PIPERAZINES

[72] Inventor: Henryk A. Cyba, Evanston, Ill.

[73] Assignee: Universal Oil Products Company, Des Plaines, Ill.

[22] Filed: May 21, 1969

[21] Appl. No.: 826,721

Related U.S. Application Data

[63] Continuation-in-part of Ser. No. 370,079, May 25, 1964, Pat. No. 3,446,808.

[52] U.S. Cl. ............260/268 R, 260/250 A, 260/251 R, 260/586 R
[51] Int. Cl. ............................................C07d 51/70
[58] Field of Search..................260/261 R, 268 C, 243 AA

[56] References Cited

UNITED STATES PATENTS

| | | | |
|---|---|---|---|
| 2,419,366 | 4/1947 | Northey et al. | 260/268 |
| 2,574,407 | 11/1951 | Malkemus et al. | 260/268 |
| 2,643,255 | 6/1953 | Morren | 260/268 |
| 3,318,806 | 5/1967 | Ernst | 260/268 X |
| 3,442,807 | 5/1969 | Law | 260/289 X |
| 3,446,808 | 5/1969 | Cyba | 260/268 X |
| 3,451,933 | 6/1969 | Leister | 260/268 X |
| 3,505,334 | 4/1970 | Regnier | 260/268 |
| 3,342,816 | 9/1967 | Mills | 260/268 X |

OTHER PUBLICATIONS

Chem. Abstr. Subject Index, Vol. 56– 65, Phi–Pr. pg. 17, 647s (1962– 1966).

*Primary Examiner*—Donald G. Daus
*Attorney*—James R. Hoatson, Jr. and Bernard L. Kramer

[57] ABSTRACT

N-hydroxyalkyl-N'-hydrocarbyl saturated cyclic diazine or N-alkoxyalkyl-N'-hydrocarbyl saturated cyclic diazine in which said hydrocarbyl is sec-alkyl or cycloalkyl. The novel compound possesses utility as an additive to retard deterioration or organic substances due to weathering, oxidation, etc., and as a curing catalyst for urethanes.

4 Claims, No Drawings

N HYDROXY ALKYL-N'CYCLOALKYL PIPERAZINES

CROSS REFERENCE TO RELATED APPLICATIONS

This is a continuation-in-part of copending application Ser. No. 370,079 filed May 25, 1964, now U.S. Pat. No. 3,446,808 issued May 27, 1969.

BACKGROUND OF THE INVENTION

The aforesaid patent is directed to borates of N-hydroxyalkyl heterocyclic saturated compounds and to the use thereof as additives in organic substances to retard deterioration due to weathering, oxidation, etc. The heterocyclic compounds disclosed in the parent application include those containing one or two nitrogen atoms in the ring.

DESCRIPTION OF THE INVENTION

It is believed that some of the heterocyclic compounds disclosed in the parent application are new compositions of matter and the present application is directed to these compounds, among others, as new compositions of matter and to the use of these compounds as additives to organic substances.

In one embodiment the present invention relates to a N-oxyalkyl-N'-hydrocarbyl-saturated cyclic diazine in which said hydrocarbyl is sec-alkyl or cycloalkyl.

In a specific embodiment the present invention relates to a N-hydroxyalkyl-N'-hydrocarbyl-saturated cyclic diazine in which said alkyl contains from one to 10 carbon atoms and said hydrocarbyl is preferably sec-alkyl of from three to about 40 carbon atoms or cycloalkyl of from three to about 12 carbon atoms.

In another specific embodiment the present invention relates to a N-alkoxyalkyl-N'-hydrocarbyl-saturated cyclic diazine in which said alkyl contains from one to about 10 carbon atoms, said hydrocarbyl is preferably sec-alkyl of from three to about 40 carbon atoms or cycloalkyl of from three to about 12 carbon atoms and said alkoxy contains from one to about 10 carbon atoms.

When the nitrogen atoms of the heterocyclic ring are in a position para to each other, the compound is a piperazine derivative. When the N-substituent is hydroxyalkyl and the N'-hydrocarbyl substituent is sec-alkyl, preferred compounds comprise those in which the alkyl group contains two carbon atoms, although it is understood that the alkyl group may contain one or from three to about 10 carbon atoms. Illustrative compounds in which the alkyl group contains two carbon atoms include N-hydroxyethyl-N'-iso-propyl-piperazine, N-hydroxyethyl-N'-sec-butyl-piperazine, N-hydroxyethyl-N'-sec-pentyl-piperazine, N-hydroxyethyl-N'-sec-hexyl-piperazine, N-hydroxyethyl-N'-sec-heptyl-piperazine, N-hydroxyethyl-N'-sec-octyl-piperazine, N-hydroxyethyl-N'-sec-nonyl-piperazine, N-hydroxyethyl-N'-sec-decyl-piperazine, N-hydroxyethyl-N'-sec-undecyl- piperazine, N-hydroxyethyl-N'-sec-dodecyl-piperazine, N-hydroxyethyl- N'-sec-tridecyl-piperazine, N-hydroxyethyl-N'-sec-tetra decyl-piperazine, N-hydroxyethyl-N'-sec-pentadecyl-piperazine, N-hydroxyethyl-N'-sec-hexadecyl-piperazine, N-hydroxyethyl-N'-sec-heptadecyl-piperazine, N-hydroxyethyl-N'-sec-octadecyl-piperazine, N-hydroxyethyl-N'-sec-nonadecyl-piperazine, N-hydroxyethyl-N'-sec-eicosyl-piperazine, etc. When the N-hydrocarbyl substituent is cycloalkyl, the cycloalkyl preferably is cyclohexyl and thus the compound will be N-hydroxyalkyl-N'-cyclohexyl-piperazine. Other compounds in which the hydrocarbyl substituent is cycloalkyl comprise N-hydroxyethyl-N'-cyclopropyl-piperazine, N-hydroxyethyl-N'-cyclobutyl-piperazine, N-hydroxyethyl-N'-cyclopentyl-piperazine, N-hydroxyethyl-N'-cycloheptyl-piperazine, N-hydroxyethyl-N'-cyclooctyl-piperazine, N-hydroxyethyl-N'-cyclononyl-piperazine, N-hydroxyethyl-N'-cyclodecyl-piperazine, N-hydroxyethyl-N'-cycloundecyl-piperazine, N-hydroxyethyl-N'-cyclododecyl-piperazine, etc. As herein before set forth, it is understood that hydroxyethyl group may be replaced by hydroxymethyl, hydroxypropyl, hydroxybutyl, hydroxypentyl, hydroxyhexyl, hydroxyheptyl, hydroxyoctyl, hydroxynonyl, hydroxydecyl, etc.

When the N-substituent is alkoxyalkyl, the alkoxy group may contain from one to about 10 carbon atoms and the alkyl group contains from one to about 10 carbon atoms. Here again preferred compounds comprise those in which the alkyl group contains two carbon atoms and thus illustrative compounds include N-methoxyethyl-N'-hydrocarbyl-piperazine, N-ethoxy ethyl-N'-hydrocarbyl-piperazine, N-propoxyethyl-N'-hydrocarbyl piperazine, N-butoxyethyl-N'-hydrocarbyl-piperazine, N-pentoxyl ethyl-N'-hydrocarbyl-piperazine, N-hexoxyethyl-N'-hydrocarbyl-piperazine N-heptoxyethyl-N'-hydrocarbyl-piperazine, N-octoxyethyl-N'-hydrocarbyl-piperazine, N-nonoxyethyl-N'-hydrocarbyl-piperazine and N-decoxyethyl-N'-hydrocarbyl-piperazine, in which the hydrocarbyl group is selected from sec-alkyl of from three to about 40 carbon atoms or cycloalkyl of from three to about 12 carbon atoms in the cyclic structure. Here again it is understood that the alkyl group may contain one or from three to about 10 carbon atoms and thus is selected from methyl, propyl, butyl, pentyl, hexyl, heptyl, octyl, nonyl, decyl, etc. Illustrative compounds in this embodiment include N-methoxyethyl-N'-sec-hexyl-piperazine, N-methoxyethyl-N'-sec-heptyl-piperazine, N-methoxyethyl-N'-sec-octyl-piperazine, N-methoxyethyl-N'-sec-nonyl-piperazine, N-methoxyethyl-N'-sec-decyl-piperazine, N-methoxyethyl-N'-cyclohexyl-piperazine, N-ethoxyethyl-N'-sec-hexyl-piperazine, N-ethoxyethyl-N'-sec-heptyl-piperazine, N-ethoxyethyl-N'-sec-octyl-piperazine, N-ethoxyethyl-N'-sec-nonyl-piperazine, N-ethoxyethyl-N'-sec-decyl piperazine, N-ethoxyethyl-N'-cyclohexyl-piperazine, N-propoxyethyl-N'-sec-hexyl-piperazine, N-propoxyethyl-N'-sec-heptyl-piperazine, N-propoxyethyl-N'-sec-octyl-piperazine, N-propoxyethyl-N'-sec-nonyl-piperazine, N-propoxyethyl-N'-sec-decyl-piperazine, N-propoxyethyl-N'-cyclohexylpiperazine, N-propoxypropyl-N'-sec-hexyl-piperazine, N-propoxypropyl-N'-sec-heptyl-piperazine, N-propoxypropyl-N'-sec-octyl-piperazine, N-propoxypropyl-N'-sec-nonyl-piperazine, N-propoxypropyl-N'-sec-decyl-piperazine, N-propoxypropyl-N'-cyclohexyl-piperazine, etc.

The particular compounds set forth above are derivatives of piperazine in which the nitrogen atoms are in a position para to each other. When the nitrogen atoms are in a position meta to each other, the compounds will be derivatives of hexahydroxypyrimidine. These compounds comprise N-hydroxyalkyl-N'-sec-alkyl-hexahydropyrimidine, N-hydroxyalkyl-N'-cycloalkyl-hexahydropyrimidine, N-alkoxyalkyl-N'-sec-alkyl-hexahydropyrimidine and N-alkoxyalkyl-N'-cycloalkyl-hexahydro pyrimidine in which the alkyl, secalkyl, cycloalkyl and alkoxy moieties are defined as hereinbefore set forth. Typical illustrative compounds in this embodiment include N-hydroxyethyl-N'-sec-hexyl-hexahydropyrimidine, N-hydroxyethyl-N'-sec-heptyl-hexahydropyrimidine, N-hydroxyethyl-N'-sec-octyl-hexahydropyrimidine, N-hydroxyethyl-N'- -sec-nonyl-hexahydropyrimidine, N-hydroxyethyl-N'-sec-decyl-hexahydropyrimidine, N-hydroxyethyl-N'-cyclohexyl-hexahydropyrimidine, N-methoxyethyl-N'-sec-hexyl-hexahydropyrimidine, N-methoxyethyl-N'-sec-heptyl-hexahydropyrimidine, N-methoxyethyl-N'-sec-octyl-hexahydropyrimidine, N-methoxyethyl-N'-sec-nonyl-hexahydropyrimidine, N-methoxyethyl-N'-sec-decyl-hexahydropyrimidine, N-methoxyethyl-N'-cyclohexyl-hexahydropyrimidine, N-ethoxyethyl-N'-sec-hexyl-hexahydropyrimidine, N-ethoxyethyl-N'-sec-heptyl-hexahydropyrimidine, N-ethoxyethyl-N'-sec-octyl-hexahydropyrimidine, N-ethoxyethyl-N'-sec-nonyl-hexahydropyrimidine, N-ethoxyethyl-N'-sec-decyl-hexahydropyrimidine, N-ethoxyethyl-N'-cyclohexyl-hexahydropyrimidine, N-propoxypropyl-N'-sec-hexyl-hexahydropyrimidine, N-propoxypropyl-N'-sec-heptyl-hexahydropyrimidine, N-propoxypropyl-N'-sec-octyl-hexahydropyrimidine, N-propoxypropyl-N'-sec-nonyl-hexahydropyrimidine, N-propoxypropyl-N'-sec-decyl-hexahydropyrimidine, N-propoxypropyl-N'-cyclohexyl-hexahydropyrimidine, etc. Here again it is understood that the above compounds are illustrative only and that other N- hydroxyalkyl-N'-hydrocarbyl-hexahydropyrimidines and other N2alkoxyalkyl-N'-hydrocarbyl-hexahydropyrimidines are included in the present invention with the understanding that the alkyl, hydrocarbyl and alkoxy groups will be as hereinbefore defined.

When the nitrogen atoms are in a position ortho to each other, the compound will be a derivative of hexahydropyridazine. These compounds comprise N-hydroxyalkyl-N'-sec-alkyl-hexahydropyridazine, N-hydroxyalkyl-N'-cycloalkyl-hexahydropyridazine, N-alkoxyalkyl-N'-sec-alkyl-hexahydropyridazine, N-alkoxyalkyl-N'-cycloalkyl-hexahydropyridazine in which the alkyl, sec-alkyl, cycloalkyl and alkoxy moieties are defined as hereinbefore set forth. Typical illustrative compounds in this embodiment include N-hydroxyethyl-N'-sec-hexyl-hexahydropyridazine, N-hydroxyethyl-N'-sec-heptyl-hexahydropyridazine, N-hydroxyethyl-N'-sec-octyl-hexahydropyridazine, N-hydroxyethyl-N'-sec-nonyl-hexahydropyridazine, N-hydroxyethyl-N'-sec-decyl-hexahydropyridazine, N-hydroxyethyl-N'-cyclohexyl-hexahydropyridazine, N-methoxy-N'-sec-hexyl-hexahydropyridazine, N-methoxyethyl-N'-sec-heptyl-hexahydropyridazine, N-methoxyethyl-N'-sec-octyl-hexahydropyridazine, N-methoxyethyl-N'-sec-nonyl-hexahydropyridazine, N-methoxyethyl-N'-sec-decyl-hexahydropyridazine, N-methoxyethyl-N'-cyclohexyl-hexahydropyridazine, N-ethoxy-N'-sec-hexyl-hexahydropyridazine, N-ethoxyethyl-N'-sec-heptyl-hexahydropyridazine, N-ethoxyethyl-N'-sec-octyl-hexahydropyridazine, N-hydroxyethyl-N'-sec-nonyl-hexahydropyridazine, N-ethoxyethyl-N'-sec-decyl-hexahydropyridazine, N-ethoxyethyl-N'-cyclohexyl-hexahydropyridazine, N-propoxypropyl-N'-sec-hexyl-hexahydropyridazine, N-propoxypropyl-N'-sec-heptyl-hexahydropyridazine, N-propoxypropyl-N'-sec-octyl-hexahydropyridazine, N-propoxypropyl-N'-sec-nonyl-hexahydropridazine, N-propoxypropyl-N'-sec-decyl-hexahydropyridazine, N-propoxypropyl-N'-cyclohexyl-hexahydropyridazine, etc.

The novel compounds of the present invention are prepared in any suitable manner. In some cases, the N-hydroxyalkyl saturated cyclic diazine may be purchased in the open market and then is subjected to reductive alkylation. When the N-hydroxyalkyl saturated cyclic diazine is not available commercially it may be prepared in any suitable manner. The following preparation will be described with reference to piperazine derivatives, with the understanding that it applies equally to the hexahydropyrimidine or hexahydropyridazine. For example, piperazine may first be subjected to oxyalkylenation and then is subjected to reductive alkylation. In another method piperazine is first subjected to reductive alkylation and then is subjected to oxyalkylenation. The oxyalkylenation is effected in any suitable manner and may be accomplished by charging piperazine or N-alkyl-piperazine in which a reaction zone and passing an alkylene oxide and particularly ethylene oxide into the reaction zone. Equal mole proportions of the alkylene oxide and of piperazine are employed. When desired, an excess of one of the reactants may be present in order to insure complete reaction. The oxyalkylenation reaction readily occurs at a low temperature which may range from room temperature to 150° C. in the absence of a catalyst. As hereinbefore set forth, ethylene oxide is preferred. Other alkylene oxides include propylene oxide, butylene oxide, pentylene oxide, hexylene oxide, etc. When the oxyalkylenation is conducted first, the reaction products are fractionated or otherwise treated to separate the mono-oxyalkylenated product from the reaction mixture.

When the N-substituent is alkoxyalkyl, this may be prepared in any suitable manner. In one embodiment piperazine, hexahydropyrimidine or hexahydropyridazine is reacted with an alkoxyalkyl halide as, for example, beta-methoxyethyl chloride, beta-ethoxyethyl chloride, beta-propoxyethyl chloride, beta-butoxyethyl chloride, etc., beta-methoxyethyl bromide, beta-ethoxyethyl bromide, beta-propoxyethyl bromide, beta-butoxyethyl bromide, etc. This reaction is effected by refluxing the reactants in a non-reactive solvent, as, for example, alcohol, ketone, ether, cyclic ether, water, etc., preferably in the presence of a hydrogen halide acceptor such as sodium carbonate, sodium bicarbonate, potassium carbonate, potassium bicarbonate, triethylamine, pyridine, etc. or in the presence of one mole or more excess of the diazine. In another embodiment the N-hydroxyalkyl-piperazine, N-hydroxyalkyl-hexahydropyrazine or N-hydroxyalkyl-hexahydro-pyridazine, preferably after being subjected to reductive alkylation to form the corresponding N'-hydrocarbyl derivative, is reacted with a suitable reactant, such as dimethyl sulfate, diethyl sulfate, dipropyl sulfate, etc. The reaction generally is effected at room temperature or a moderate elevated temperature, generally not above about 30° C. or it may be effected at temperatures as low as −10° C., and preferably in a solvent such as ketone, ether, tetrahydro furan, water, etc. In another embodiment aryl halides such as methyl bromide, ethyl bromide, propyl bromide, butyl bromide and in some cases corresponding chlorides are reacted in the presence of acid acceptors, enumerated above. When the reactant is at low boiling, the reaction is effected under superatmospheric pressure which may range from 20 to 500 psi to maintain the reactants in liquid phase. The methylations, ethylations, etc. are preferably conducted in glacial acetic acid in the presence of 6N hydrochloric acid or 5N sulfuric acid.

As hereinbefore set forth, piperazine, N-hydroxyalkyl-piperazine, hexahydropyrimidine, N-hydroxyalkyl-hexahydropyrimidine, hexahydro-pyridazine or the N-hydroxyalkyl-hexahydro-pyridazine is subjected to reductive alkylation. Here again the following description will be directed to the reductive alkylation of piperazine or N-hydroxyalkyl piperazine, with the understanding that it also applies to the reductive alkylation of hexahydropyrimidine, N-hydroxyalkyl-hexahydropyrimidine, hexahydropyridazine or N-hydroxyalkyl-hexahydropyridazine. In one embodiment the reductive alkylation is effected using an alkyl ketone in order to prepare the corresponding N-sec-alkyl derivative. Any suitable alkyl ketone may be used and will be selected to produce the desired substituent. Illustrative preferred ketones include acetone, methyl ethyl ketone, methyl propyl ketone, methyl butyl ketone, methyl pentyl ketone, methyl hexyl ketone, methyl heptyl ketone, methyl octyl ketone, methyl nonyl ketone, methyl decyl ketone, etc., diethyl ketone, ethyl propyl ketone, ethyl butyl ketone, ethyl pentyl ketone, ethyl hexyl ketone, ethyl heptyl ketone, ethyl octyl ketone, ethyl nonyl ketone, etc., dipropyl ketone, propyl butyl ketone, propyl pentyl ketone, propyl hexyl ketone, propyl heptyl ketone, propyl octyl ketone, etc., dibutyl ketone, butyl pentyl ketone, butyl hexyl ketone, butyl heptyl ketone, butyl octyl ketone, etc., dipentyl ketone, pentyl hexyl ketone, pentyl heptyl ketone, pentyl octyl ketone, etc., dihexyl ketone, hexyl heptyl ketone, hexyl octyl ketone, etc., diheptyl ketone, heptyl octyl ketone, dioctyl ketone, etc. It is understood that the ketone may be of straight or branched chain configuration. In another embodiment a cycloalkyl ketone is used and preferably comprises cyclohexanone. Other cyclic ketones include cyclopropanone, cyclobutanone, cyclopentanone, cycloheptanone, cyclooctanone, cyclononanone, cyclodecanone, cycloundecanone and cyclododecanone. The ketones are available commercially or may be synthesized as required. A number of ketones and particularly the higher boiling ketones are available as mixtures which are either products or byproducts of commercial operations. These mixtures generally are available at comparatively low cost and, as another advantage of the present invention, the mixtures may be used without the added time and expense of separating specific compounds in pure state. One such mixture available commercially is "Stearone" which is diheptadecyl ketone.

The reductive alkylation of the ketone and cyclic diazine is effected in any suitable manner. The mole ratio of ketone to cyclic diazine to be reacted is 1 mole of ketone per mole of cyclic diazine. When reacting a N-hydroxyalkylcyclic diazine, an excess of ketone preferably is employed to insure complete reaction and this excess may range up to about 20 mole proportions of ketone per 1 mole proportion of cyclic diazine. The reductive alkylation is effected in the presence of hydrogen and a suitable reductive alkylation catalyst in one step, which may be either continuous or batch type operation. Any suitable reductive alkylation catalyst is employed including those containing nickel, platinum, palladium, etc., preferably composited with a suitable support. A particularly preferred catalyst comprises a composite of platinum and alumina, which may or may not contain combined halogen. The platinum generally is present in the catalyst in a concentration of from about 0.1 percent to about 2 percent by weight of the final catalyst and the halogen, when present, is in a concentration of total halogen of from about 0.01 percent to about 1 percent by weight of the final catalyst, the halogen preferably comprising fluorine and/or chlorine. Another suitable catalyst comprises an intimate mixture of copper oxide, chromium oxide and barium oxide. When using the platinum catalyst, the temperature generally will be within the range of from about 90° to about 260°C. and the hydrogen pressure will be from about 100 to about 3,000 pounds per square inch or more.

In a continuous type operation, the catalyst is disposed as a fixed bed in a reaction zone and the cyclic diazine or N-hydroxyalkyl cyclic diazine, ketone and hydrogen, at the required temperature and pressure, are passed through the catalyst in either upward or downward flow. The reactor effluent is separated into a hydrogen stream and unreacted products, all or part of which may be recycled to the reaction zone, and the alkylated cyclic diazine is separated from the other products. In a batch type operation the cyclic diazine or N-hydroxyalkyl cyclic diazine, ketone and catalyst are disposed in a reaction zone which is pressured with hydrogen and then heated to desired temperature. After cooling, the products are separated to recover the alkylated cyclic diazine. While the 1-step process generally is preferred it is understood that the reaction may be effected in two steps. In the first step, effected in the absence of hydrogen, the Shiff base is first prepared and then is hydrogenated in a separate step to form the desired alkylated compound.

The novel compounds of the present invention possess varied utility. In one embodiment they are used in substrates exposed to weather and in this embodiment the compounds of the present invention serve as weathering stabilizers. Deterioration due to weathering includes oxidation, generally enhanced in the presence of ultraviolet light, thermal effects, etc. In another embodiment the compounds of the present invention are effective antioxidants and stabilizers particularly for petroleum products.

The substrates normally subjected to exposure to weathering, which may be stabilized by the compounds of the present invention, include plastics, resins, paints, varnish, other coating, fiber, textile, etc. The plastics include polyolefins and particularly polyethylene, polypropylene, polybutylene, mixed ethylene propylene polymers, mixed ethylene butylene polymers, mixed propylene butylene polymers, terpolymers prepared from monoolefins and diolefins, etc. Other plastics and resins which may be stabilized by the compounds of the present invention include polystyrene, polyphenyl ether, acrylonitrile-butadiene-styrene copolymers, polyvinyl chloride and other vinyl resins which are derived from monomers such as vinyl chloride, vinyl acetate, vinylidine chloride, etc. or those vinyl type resins comprising copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof. Still other plastics are in the textile class and include Nylon (polyamide), Perlon L or 6-Nylon (polymide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), Rayon, etc. Still other plastics which may be stabilized in accordance with the present invention include polyurethanes, both the urethane foam and the rigid resin, epoxy resin, polycarbonates, phenol formaldehyde resin, urea formaldehyde resins, melamine formaldehyde resins, acryloid plastics, polyacetals, especially polyformaldehydes, polyesters, including linear or cross-linked, reinforced polyesters, etc. In another embodiment the compounds of the present invention are used as additives in rubber, which may be natural or synthetic and are comprised of polymers of conjugated 1,3-dienes, either as polymers thereof or as copolymers thereof with other polymerizable compounds.

The compounds of the present invention are particularly useful as curing agents for plastics and resins which undergo curing during the manufacture thereof, including particularly polyurethane and polyurethane foams. The polyurethanes generally are prepared by the reaction of an isocyanate with a polyol and/or polyester as, for example, by the reaction of toluene-2,4-diisocyanate with polytetramethyleneether glycol, alone or in combination with other additional diols and/or other diisocyanates. In still another embodiment the compound is used as a curing agent for epoxy resins. The epoxy resins are formed by the reaction of a 1,2-epoxy compound and a dihydric phenol or polyalcohol as, for example, the reaction of an epichlorohydrin with bis-phenol-A(2,2-bis-(4-hydroxyphenyl)-propane. In still another embodiment the compound is used as a curing agent in polycarbonates. The polycarbonates comprise polyesters of carbonic acid, which are derived from dihydroxyl compounds in which the hydroxyl groups are directly attached to aromatic rings as, for example, the polyester prepared by reacting carbonic acid and bis-phenol-A. In general, the curing agent is employed in a concentration of from 0.1 percent to about 1 percent by weight of the reaction mixture.

The compounds of the present invention also are of particular utility as additives in other organic substances and particularly hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In the oils, the compounds of the present invention serve to inhibit oxidative deterioration, thermal deterioration, etc., thereby retarding and/or preventing sediment formation, dispersion of sediment when formed, preventing and/or retarding discoloration, rust or corrosion inhibitor, detergent, etc. In gasoline, the additive improves the combustion characteristics of the gasoline.

In many applications it is advantageous to utilize the compounds of the present invention in conjunction with other additives, For example, particularly improved results are obtained in the stabilization of plastics, apparently due to a synergistic effect, when the compound of the present invention is used in admixture with a phenolic antioxidant including particularly 2,6-ditertiarybutyl-4-methylphenol. Other inhibitors which may be used generally will be of the phenolic or amine type and include phenyl-alpha-naphthylamine, phenyl-beta-naphthylamine, phenothiazine, Nonox WSP, Nonox Cl, dialkylated phenols, trialkylated phenols including 2,4-dimethyl-6-tertiarybutylphenol, etc., Santonox R, Santowhite, alkyl-alkoxyphenols, 2246 (2,2'-methylene-bis-(4-methyl-6-tert-butylphenol) and 425 (2,2'-methylene-bis-(4-ethyl-6-tert-butylphenol) (American Cyanamid), diphenyl-p-phenylene-diamine, 1,1,3-tris-(2-methyl-4-hydroxy-5-t-butylphenyl)-butane, 703 (2,6-di-tert-butyl-alpha-dimethylamino-p-cresol) (Ethyl Corporation), 4,4'-bis-(2-methyl-6-tert-butylphenol); 4,4'-thio-bis-(6-tert-butyl-o-cresol); 4,4'-bis-(2,6-di-tert-butylphenol); 4,4'-methylene-bis-(2,6-di-tert-butylphenol); Salol (salicylic acid esters), p-octyl-phenylsalicylate, various phosgene alkylated phenol reaction products, various alkoxyalkyldihydroxybenzophenones, polyalkyldihydroxybenzophenones, tetrahydroxybenzophenones, 2,4,5-trihydroxybutyrophenone, etc., and especially such hydroxybenzophenones as 2,2'-dihydroxy-4-octoxybenzophenone, 2,2'-dihydroxy-4-decoxy-benzophenone, 2,2'-dihydroxy-4-dodecoxybenzophenone, 2,2'-dihydroxy-4-octadecoxybenzophenone, etc., in general any alkoxy or cycloalkoxy substituted 2,2'-dihydroxybenzophenone, 2-hydroxy-4'-octoxybenzophenone, 2-hydroxy-4'-decoxybenzophenone, 2-hydroxy-4'-dodecoxy, etc., and in general any alkoxy or cycloalkoxy substituted 2-hydroxybenzophenone. Other ultraviolet light stabilizers include nickel-bis-dithiocarbamates and especially nickel-bis-dibutyldithiocarbamate, nickel-bis-dihydroxypolyalkylphenol sulfides, especially [2,2'-thiobis-(4-t-octylphenolato)]-n-butylamine nickel (II), dilauryl beta-mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, various N-hydroxyphenylbenzotriazoles such as 2-(2'-hydroxy-5'-octylphenyl)-benzotriazole, 2-(2'-hydroxy-5'-dodecylphenyl)-benzotriazole, 2-(2'-hydroxy-5'-octoxyphenyl)-benzotriazole, 2-(2'5'-dodecoxyphenyl)-benzotriazole, Tinuvin 326, etc., in general, any alkyl or alkoxyphenyl substituted benzotriazole, etc. The additional inhibitor may be used in a concentration of from about 1 percent to about 75 percent by weight of the compound of the present invention. Generally, the additional inhibitor will be used in a concentration within the range of from about 0.001 percent to about 3 percent and more particularly from about 0.01 percent by weight of the substrate.

The additive of the present invention will be used in a stabilizing concentration which will depend upon the particular substrate. The additive may be used in a concentration as low as 0.0001 percent to about 25 percent but generally will be used in a concentration of from about 0.01 percent to about 5 percent by weight of the substrate. When used in hydrocarbon distillate and particularly gasoline, the additive generally is used in a concentration of from about 0.0001 percent to about 0.5 percent. The additive is incorporated in the substrate in any suitable manner. For example, when it is incorporated into a plastic, resin or the like, it may be added to the hot melt with stirring, generally in a Banbury mixer, extruder or other device. When it is added to a liquid, it is incorporated into the liquid with intimate stirring. When it is added to a multicomponent mixture, as, for example, grease, it may be added to one of the components and, in this manner, incorporated into the final mix or it may be added directly into the final mix.

The additive of the present invention may be utilized as such or prepared as a solution in a suitable solvent including alcohols and particularly methanol, ethanol, propanol, butanol, etc., hydrocarbons and particularly benzene, toluene, xylene, cumene, decalin, etc.

The following examples are introduced to illustrate further the novelty and utility of the present invention but not with the intention of unduly limiting the same.

EXAMPLE I

The compound of this example is N-hydroxyethyl-N'-sec-octyl-piperazine and was prepared as follows. Hydroxyethyl-piperazine, which is available in the open market, was subjected to reductive alkylation by reacting 240 g. of the hydroxyethyl-piperazine and 500 g. of methyl hexyl ketone at 160° C. in the presence of hydrogen and an alumina-platinum catalyst containing about 0.3 percent by weight of platinum. The resultant N-hydroxyethyl-N'-sec-octyl-piperazine was analyzed and found to have a basic nitrogen of 8.27 meq./g. and a basic mole combining weight of 121 which corresponds to the theoretical basic mole combining weight of 121. The product had an index of refraction $n_D^{20}$ of 1.4787, and the boiling point of 310° C. at atmospheric pressure or 114° C. at 0.5 MM mercury, both uncorrected.

EXAMPLE II

The compound of this example is N-(2-hydroxypropyl)-N'-cyclohexyl-piperazine and is prepared by subjecting 100 g. of N-(2-hydroxypropyl)-piperazine to reductive alkylation with 200 g. of cyclohexanone at a temperature of 150° C. in a 1,800 liter rocking autoclave, in contact with 50 grams of a sulfided alumina-platinum catalyst under an imposed hydrogen pressure of 100 atmospheres. After the theoretical amount of hydrogen is consumed, the reaction is discontinued and the reaction products are allowed to cool to room temperature. The effluent products then are filtered to remove N-(2-hydroxypropyl)-N'-cyclohexyl piperazine as a liquid product containing 8.85 meq./g. of basic nitrogen.

EXAMPLE III

The compound of this example is N-(3-hydroxypropyl)-N'-cyclohexyl-hexahydro-pyrimidine. Hexahydropyrimidine is oxypropylenated by reacting equal mole proportions of propylene oxide with hexahydropyrimidine, and the resulting N-hydroxypropyl-hexahydro-pyrimidine is subjected to reductive alkylation with cyclohexanone in the presence of an alumina-platinum catalyst.

EXAMPLE IV

The compound of this example is N-hydroyethyl-N'-decyl-hexahydropyridazine. It is prepared by the oxyethylenation of hexahydropyridazine by reacting equal mole proportions of ethylene oxide and hexahydropyridazine at room temperature. The resultant N-hydroxyethyl-hexahydropyridazine is subjected to reductive alkylation with methyl octyl ketone at 160° C. in the presence of hydrogen and an alumina-platinum catalyst containing about 0.3 percent by weight of platinum.

EXAMPLE V

The compound of this example is N-methoxyethyl-N'-cyclohexyl-piperazine and is prepared by reductively alkylating 200 g. of N-methoxyethyl-piperazine with 400 g. of cyclohexanone at a temperature of 160° C. under a hydrogen pressure of 100 atmospheres in contact with 50 g. of a sulfided platinum-alumina catalyst. The reaction is effected in an 1,800 cc. rocking autoclave. After completion of the reaction, which is determined when hydrogen is no longer consumed, the reaction products are cooled, filtered to remove the catalyst and then distilled to recover N-methoxyethyl-N'-cyclohexyl-piperazine as a liquid product having a basic nitrogen of 8.85 meq./g.

EXAMPLE VI

As hereinbefore set forth the compound of the present invention may be used as a weathering agent in plastic. This example compares the effectiveness of a compound of the present invention [N(2-hydroxyethyl)-N'-sec-octyl-piperazine, prepared as described in Example I] with the N(2-hydroxyethyl)-piperazine (not subjected to reductive alkylation).

The plastic of this example is solid polypropylene. The solid polypropylene without inhibitor is stated to have properties substantially as follows:

TABLE I

| | |
|---|---|
| Specific Gravity | 0.910-0.920 |
| Refractive Index, $n_D^{25}$ | 1.510 |
| Heat Distortion Temperature | |
| at 66 p.s.i. load | 116°C. |
| at 264 p.s.i. load | 66°C. |
| Tensile Yield Strength, p.s.i. | 4700 |
| (ASTM D-638-58T) | |
| (0.2" per min.) | |
| Total Elongation, % | 300-400 |
| Stiffness Flexural | 1.8 |
| (ASTM D747-50) | |
| $10^5$ p.s.i. | |

| Shore Hardness (ASTM D676-55T) | 74D |
| --- | --- |

The polypropylene was milled in a two-roll heated mill of conventional commercial design and the additive, when employed, was incorporated in the sample during the milling. The samples were pressed into sheets of about 17 mil thickness and cut into plaques of about 1⅝ × 1½". The plaques were inserted into plastic holders, affixed onto a rotating drum and exposed to carbon arc rays at about 52° C. in a Weather-Ometer. The samples were examined periodically by infrared analysis to determine the carbonyl band at 1,715 cm.$^{-1}$ which is reported as the "carbonyl number." The higher intensity of the carbonyl band indicates a higher carbonyl concentration (expressed as carbonyl number) and accordingly increased deterioration.

A sample of the polypropylene without inhibitor developed a carbonyl number of greater than 1,000 within 120 hours of exposure in the Weather-Ometer.

Another sample of the solid polypropylene containing 1 percent by weight of N(2-hydroxyethyl)-N'-sec-octyl piperazine, prepared as described in Example I, and 0.15 percent by weight of 2,6-di-tertiary-butyl-4-methylphenol developed a carbonyl value of 402 after 576 hours of exposure in the Weather-Ometer. In contrast, another sample of the solid polypropylene containing 1 percent by weight of N(2-hydroxyethyl) piperazine (not reductively alkylated) and 0.15 percent by weight of 2,6-di-tertiary-butyl-4-methylphenol developed a carbonyl number of greater than 1,000 within 192 hours of exposure in the Weather-Ometer.

EXAMPLE VII

Similar results to those reported in Example VI were obtained when the samples were exposed outdoors. Plaques prepared in the same manner as described in Example VI were exposed to weathering on an outdoor rack facing south and inclined at a −45° angle at Des Plaines, Illinois. The sample containing 1 percent by weight of N(2-hydroxyethyl)-piperazine (not reductively alkylated) and 0.15 percent by weight of 2,6-di-tertiary-butyl-4-methylphenol was placed outdoors on December 11 and reached a carbonyl value of over 1,000 by May 10 of the following year, a period of 5 months. In contrast a sample containing 1 percent by weight of N(2-hydroxyethyl)-N'-sec-octyl piperazine, prepared as described in Example I, and 0.1 percent by weight of 2,6-di-tertiary-butyl-4-methylphenol was placed outdoors on January 11 and by July 1 had reached a carbonyl value of 734. This demonstrates that the compound of the present invention was considerably more effective in retarding deterioration than was the compound not subjected to reductive alkylation.

EXAMPLE VIII

As hereinbefore set forth the compounds of the present invention also are particularly useful as additives to hydrocarbon distillates. This example illustrates the use of a compound of the present invention as an additive to fuel oil to prevent sediment formation therein. In this example, the fuel oil was a light cycle oil, which is in the No. 2 fuel oil range, and was evaluated in a 1-day fuel oil stability test. This test consists in heating the oil for 16 hours at 100° C. in an oxygen medium and then determining the sediment in the oil. The uninhibited oil, when evaluated in the above manner, contained 15.4 mg./100 ml. of sediment. Another sample of the oil containing 32 parts per million of N-hydroxyethyl-N'-sec-octyl piperazine, prepared as described in Example I contained only 1.8 mg./100 ml. of sediment.

EXAMPLE IX

Another method of evaluating fuel oils is in a 3 month storage test at 100° F. The oil used in this example is an uninhibited No. 2 commercial fuel oil, which, when evaluated in the above manner, contained 3.1 mg./100 ml. of sediment. Another sample of the oil contained 60 parts per million of N-hydroxyethyl-N'-sec-octyl piperazine prepared as described in Example I and 2 parts per million of disalicylal diaminopropane metal deactivator. When evaluated in the three months storage test, this sample contained only 0.2 mg./100 ml. of sediment. It will be noted thAt the additive is extremely effective in preventing sediment formation in the fuel oil.

EXAMPLE X

This example describes the use of a compound of the present invention as a curing catalyst in polyurethane. A urethane cushion is formed by mixing together for 10 minutes at room temperature 404 g. of commercial polyethertriol G-3530 (reaction product of propylene oxide and glycerin), 4.0 g. of polymeric silicone surfactant L–540, 14.1 g. of deionized water, 1.0 g. of N-methoxyethyl-N'-cyclohexyl piperazine, prepared as described in Example V and 1.2 g. of n-lauryl morpholine. Then 0.6 of stabilized stannous octoate T-9 (the stabilizer comprising 2,6-di-tertiary-butyl-4-methylphenol) are added and the mixture is further stirred for 2 minutes at room temperature. Finally 175 g. of toluene di-iso-cyanate (Hylene TM) is added and the mixture is stirred for 7 seconds, after which the mixture is poured into a mold which was preheated to a temperature of 105° F. and which was pretreated with a mold releasing agent. The foam is then cured in an air circulating oven for 25 minutes at 300° F. Higher I.L.D. (indentation load deflection) values at 25 percent, 65 and 80 percent deflection are obtained than when using conventional curing catalysts.

I claim as my invention:

1. N-hydroxyalkyl-N'-cycloalkyl-piperazine in which said alkyl has from 1 to 10 carbon atoms and said cycloalkyl has four to 10 carbon atoms.
2. A compound of claim 1 in which said hydroxyalkyl is hydroxyethyl.
3. A compound of claim 1 in which said cycloalkyl is cyclohexyl.
4. N-hydroxyethyl-N'-cyclohexyl-piperazine.

* * * * *